(12) United States Patent
Cato

(10) Patent No.: US 7,086,165 B2
(45) Date of Patent: Aug. 8, 2006

(54) SYSTEM AND METHOD FOR MANAGING POWER IN AN ELECTRONIC DEVICE

(75) Inventor: Robert Thomas Cato, Raleigh, NC (US)

(73) Assignee: Lenovo Pte. Ltd., Singapore ( * ) Notice: Subject to any disclaimer, the term of this patent is extended or adjusted under 35 U.S.C. 154(b) by 0 days.

(21) Appl. No.: 11/024,346

(22) Filed: Dec. 27, 2004

(65) Prior Publication Data
US 2006/0137198 A1 Jun. 29, 2006

(51) Int. Cl.
*G01C 9/06* (2006.01)
(52) U.S. Cl. ................... 33/366.24; 33/366.11
(58) Field of Classification Search .............. 33/366.24
See application file for complete search history.

(56) References Cited

U.S. PATENT DOCUMENTS

| | | | |
|---|---|---|---|
| 3,233,235 A | 2/1966 | Wright | |
| 4,571,844 A | 2/1986 | Komasaku et al. | |
| 4,703,315 A | 10/1987 | Bein et al. | |
| 4,747,216 A | 5/1988 | Kelly et al. | |
| 4,866,850 A | 9/1989 | Kelly et al. | |
| 4,923,015 A * | 5/1990 | Barsby et al. | 172/4.5 |
| 5,267,473 A * | 12/1993 | Bezos et al. | 73/129 |
| 5,630,168 A * | 5/1997 | Rosebrugh et al. | 710/5 |
| 5,746,005 A | 5/1998 | Steinberg | |
| 6,543,147 B1 | 4/2003 | Akieda | |
| 6,571,483 B1 | 6/2003 | Mangerson | |
| 2002/0073564 A1 | 6/2002 | Akieda | |
| 2003/0182809 A1 | 10/2003 | Enzinna | |
| 2004/0184273 A1* | 9/2004 | Reynolds et al. | 362/394 |
| 2005/0144795 A1* | 7/2005 | Tanner | 33/366.24 |

* cited by examiner

*Primary Examiner*—Christopher W. Fulton
(74) *Attorney, Agent, or Firm*—Sawyer Law Group LLP

(57) ABSTRACT

A system and method for conserving power in an electronic device. The system includes a processor and a tilt sensor operatively coupled to the processor. The processor utilizes the tilt sensor to monitor a tilt angle of the electronic device, and causes the electronic device to enter a power conservation state if the tilt angle falls outside of a predetermined range. As a result, the electronic device goes into a power conservation state immediately when the electronic device is no longer in use.

34 Claims, 5 Drawing Sheets

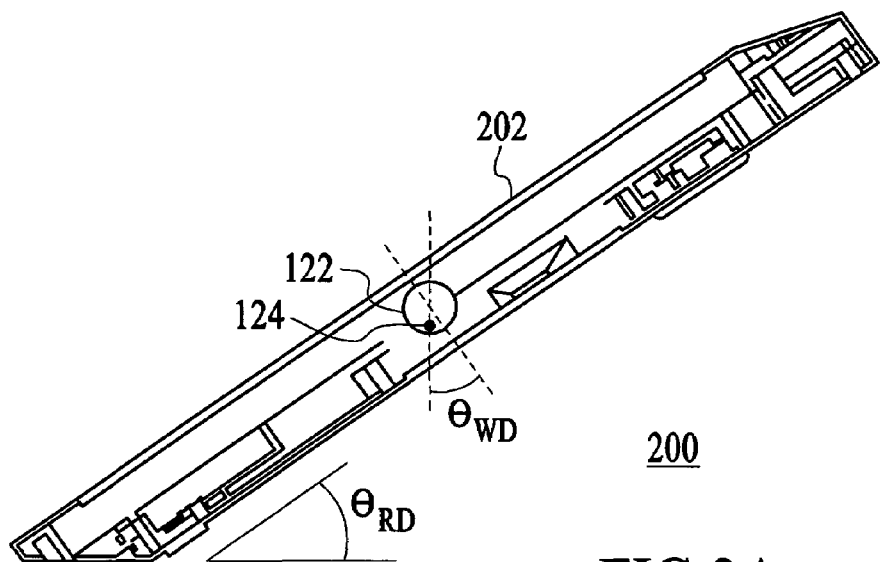
FIG.2A
FIG.2B
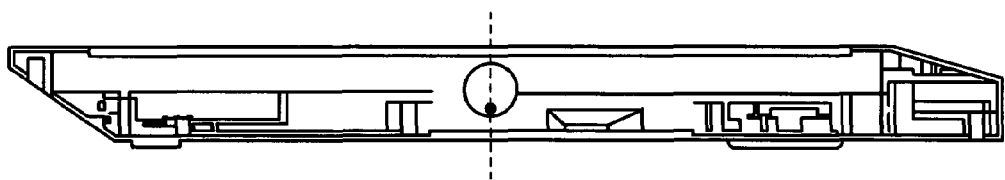
FIG.3

SYSTEM AND METHOD FOR MANAGING POWER IN AN ELECTRONIC DEVICE

FIELD OF THE INVENTION

The present invention relates to electronic devices, and more particularly to a system and method for conserving power in an electronic device.

BACKGROUND OF THE INVENTION

Power conservation is very important in portable devices. It is thus advantageous for a portable device to consume as little power as possible. To minimize power consumption, conventional devices enter a reduced-power state or "sleep mode" after a defined period of inactivity. For example, the defined period of inactivity can be 5 minutes, or 10 minutes. This defined period can be set by the user.

A problem with this conventional solution is that a device typically remains on at full power for longer than is necessary, since it is unknown when the user actually quit using the device. For example, if the defined period of inactivity is 10 minutes and the user stops using the device, the device will remain on at full power for 10 minutes.

Generally, there is not a good solution to this problem today in that the known solutions do not minimize power according to actual inactivity.

Accordingly, what is needed is an improved system and method for conserving power in an electronic device. The system and method should be able to accurately manage power consumption, and should be simple, cost effective, and capable of being easily adapted to existing technology. The present invention addresses such a need.

SUMMARY OF THE INVENTION

A system and method for conserving power in an electronic device is disclosed. The system includes a processor and a tilt sensor operatively coupled to the processor. The processor utilizes the tilt sensor to monitor a tilt angle of the electronic device, and causes the electronic device to enter a power conservation state if the tilt angle falls outside of a predetermined range. As a result, the electronic device goes into a power conservation state immediately when the electronic device is no longer in use.

BRIEF DESCRIPTION OF THE DRAWINGS

FIGS. 2A and 2B are side-view diagrams of an electronic device in an in-use position and in an out-of-use position, respectively, for which the power conservation system of FIGS. 1A and 1B can be applied, in accordance with the present invention.

FIG. 3 is a flow chart showing a method for conserving power in the electronic device 200 of FIGS. 2A and 2B in accordance with the present invention.

DETAILED DESCRIPTION OF THE INVENTION

The present invention relates to electronic devices, and more particularly to a system and method for conserving power in an electronic device. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

A system and method in accordance with the present invention for conserving power in an electronic device are disclosed. The system and method utilize a tilt sensor to determine the tilt angle of the electronic device. The tilt angle indicates whether the electronic device is in use. If the tilt angle falls outside of a predetermined range, the tilt sensor causes the electronic device to enter a power conservation state. To more particularly describe the features of the present invention, refer now to the following description in conjunction with the accompanying figures.

Although the present invention disclosed herein is described in the context of hand held devices, the present invention may apply to other types of electronic systems and still remain within the spirit and scope of the present invention.

Figure 1A:
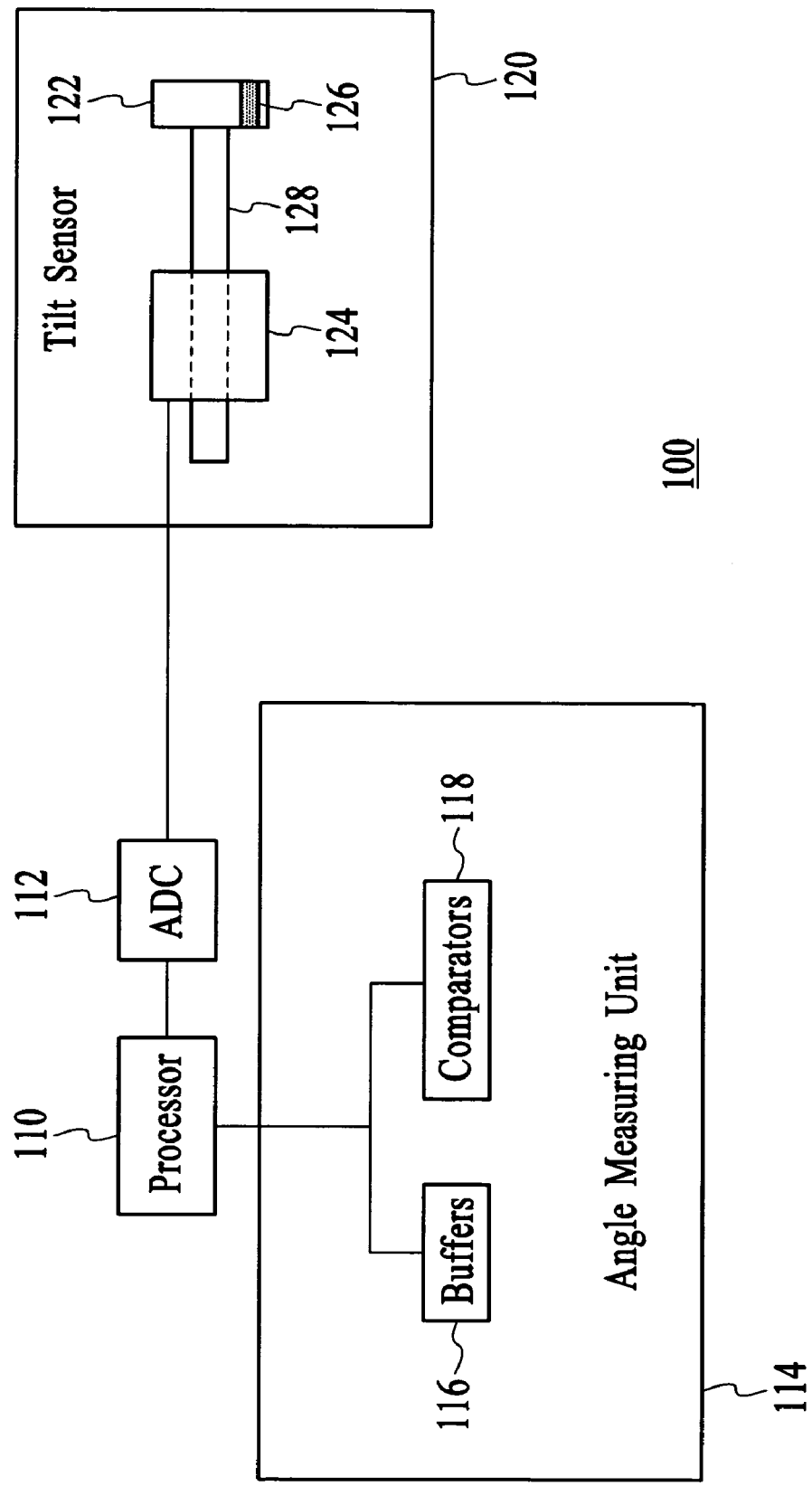
FIG. 1A is a block diagram of a power conservation system in accordance with the present invention.

FIG. 1A is a block diagram of a power conservation system 100 in accordance with the present invention. The system includes a processor 110, an analog-to-digital converter (ADC) 112, an angle thresholding unit 114, and a tilt sensor 120. The angle thresholding unit 114 includes buffers 116 and comparators 118, and the tilt sensor 120 includes a weighted device 122, and a potentiometer 124. In this specific embodiment, the comparators 118 are digital comparators. The weighted device 122 has a weight 126 and connects to the potentiometer 124 via a shaft 128. The operation of the system 100 is described below in FIGS. 2A, 2B, and 3.

Figure 1B:
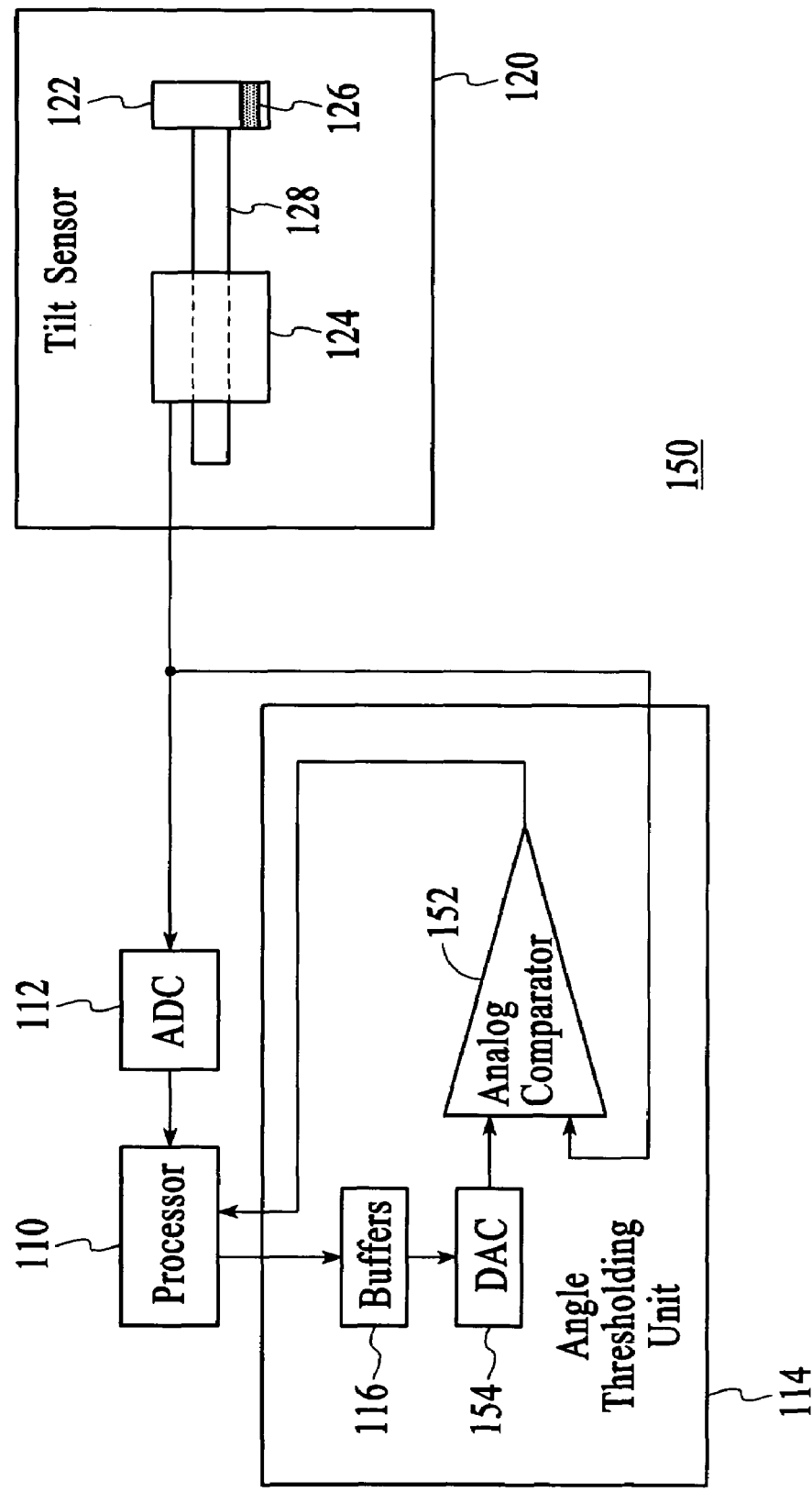
FIG. 1B is a block diagram of a power conservation system in accordance with another embodiment of the present invention.

FIG. 1B is a block diagram of a power conservation system 150 in accordance with another embodiment of the present invention. The power conservation system 150 is similar to the power conservation system 100 of FIG. 1A except that the angle thresholding unit 114 includes an analog comparator 152 instead of digital comparators. Also, the angle thresholding unit 114 includes a digital-to-analog converter (DAC) 154 coupled between the buffers 116 and the analog comparator 152. In this specific embodiment, the analog comparator 152 includes two analog comparators OR'd together (not shown).

Note that for ease of illustration, embodiments of the present invention are described below in conjunction with the embodiment shown in FIG. 1A. One of ordinary skill in the art will readily recognize that these embodiments described below equally apply to the embodiment shown in FIG. 1B, and that any other variations would be within the spirit and scope of the present invention.

Figure 4:
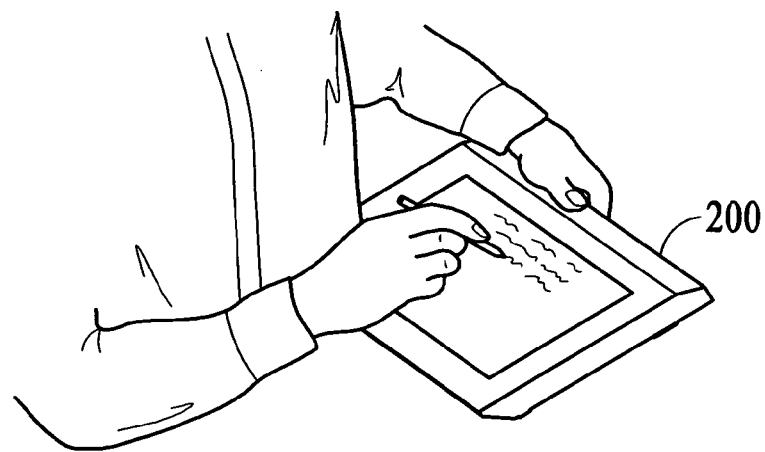
FIGS. 4 and 5 are photos illustrating various ways a user can carry the electronic device of FIGS. 2A and 2B while in use.
Figure 5:
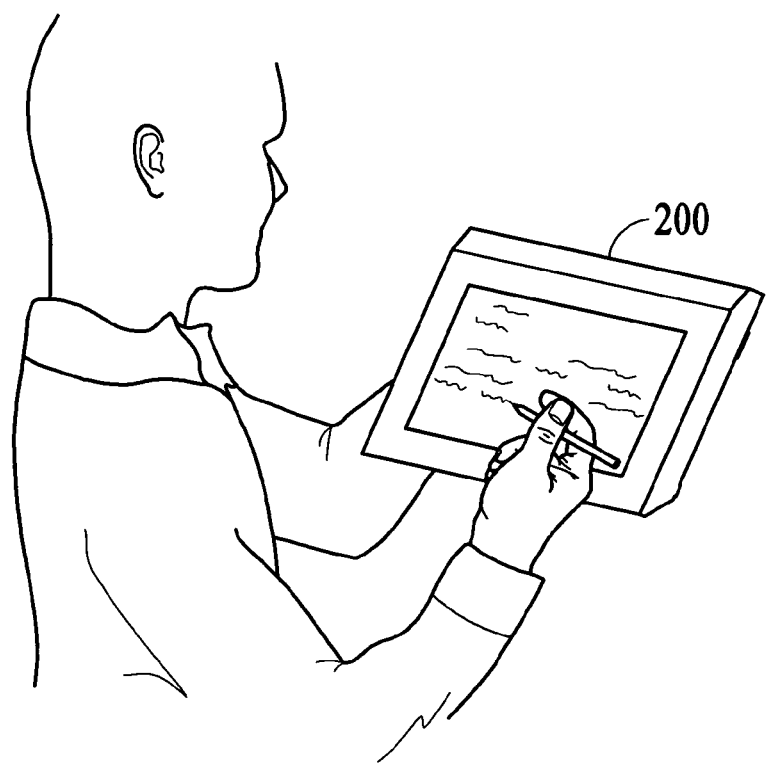

FIGS. 2A and 2B are side-view diagrams of an electronic device 200 in an in-use position and in an out-of-use position, respectively, for which the power conservation system 100 of FIGS. 1A and 1B can be applied, in accordance with the present invention. FIG. 3 is a flow chart showing a method for conserving power in the electronic device 200 of FIGS. 2A and 2B in accordance with the present invention. Referring to FIGS. 2A, 2B, and 3 together, the tilt angle $\theta_{ED}$ of the electronic device 200 is monitored, in a step 302. When the electronic device 200 is in an in-use position (FIG. 2A), the electronic device 200 is tilted up such that the user can view the monitor 202 (e.g., tilt angle $\theta_{ED}=45°$). While the electronic device is in use, the tilt angle $\theta_{ED}$ typically ranges between 0° and 90°. FIGS. 4 and 5 are photos illustrating various ways a user can carry the electronic device 200 of FIGS. 2A and 2B while in use.

Figure 6:
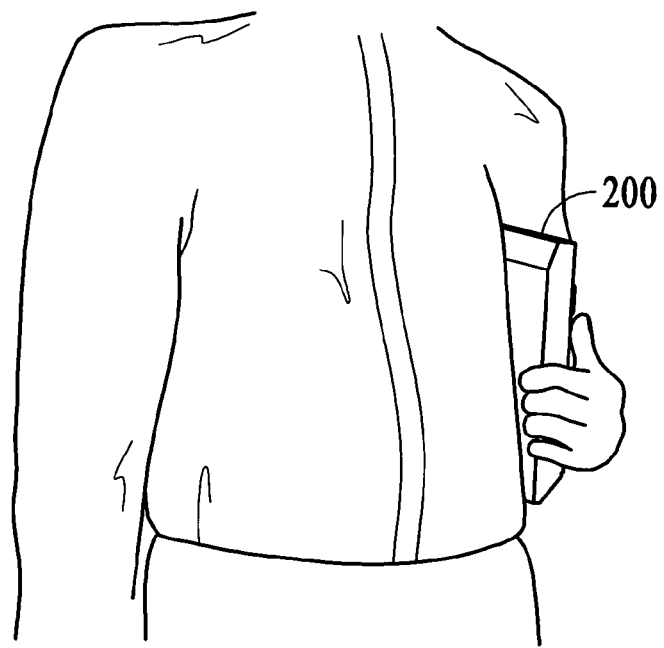
FIGS. 6 and 7 are photos illustrating various ways a user can carry the electronic device of FIGS. 2A and 2B while not in use.
Figure 7:
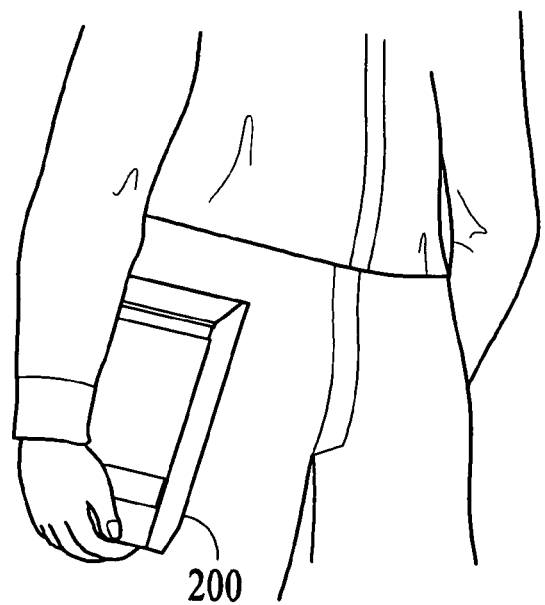

When the electronic device 200 is in an out-of-use position, the tilt angle $\theta_{ED}$ typically at 0° or 90°. For example, the electronic device 200 may be placed flat (e.g., tilt angle $\theta_{ED}=0°$) on a table (FIG. 2B). The electronic device 200 may be carried like a book, vertically at the user's side (e.g., tilt angle $\theta_{ED}=90°$). FIGS. 6 and 7 are photos illustrating various ways a user can carry the electronic device 200 of FIGS. 2A and 2B while not in use.

The tilt angle $\theta_{ED}$ can be measured continuously or periodically. Alternatively, the tilt angle $\theta_{ED}$ can be measured whenever information is entered into the electronic device 200. Such information can be any information, such as information provided by an input device (e.g., a key or touch screen or wake-up button) or information input by another device (e.g., scanner, network card) communicating with the electronic device 200.

An in-use range is determined, in a step 304. The in-use range is manually programmed by a user or learned by the power conservation system. As indicated above, the in-use range typically ranges between 0° to 90°. If the in-use range is learned by the power conservation system, the tilt angle $\theta_{ED}$ is monitored during the previous usage of the electronic device 200 and tilt angle $\theta_{ED}$ values are recorded and stored. As indicated above, the tilt angle $\theta_{ED}$ can be measured whenever information is entered into the electronic device 200 via an input device (e.g., a key or touch screen or wake-up button) or other type of device (e.g., scanner, network card) communicating with the electronic device 200. As such, the in-use range is based on the range of stored tilt angles. A benefit of a learned range is that the power conservation system can constantly adapt to a particular user. In a specific embodiment, the in-use range is stored in a user profile database when the user logs off of the electronic device 200. The stored in-use range is then available for the next time that user logs back on.

If a new user logs onto the electronic device 200, a default in-use range (e.g., between 0° and 90°) can be initially used. The power conservation system then learns an in-use range for the new user.

In a specific embodiment, a margin can be used to set the in-use range larger than the range of stored tilt angles. For example, the margin can be 1 degree to 5 degrees or more greater than the range of stored tilt angles. The margin can also be set in terms of percentages, where the in-use range is 1% up to 5% or more greater than the range of stored tilt angles. The margin can be determined and programmed by the user or by the manufacturer.

When the tilt angle $\theta_{ED}$ falls outside of the in-use range, the electronic device 200 enters a power conservation state, in a step 306 (FIG. 3). In the power conservation state, the electronic device 200 enters a low-power sleep state. Alternatively, in the power conservation state, the electronic device 100 can turn off (i.e., shut down).

In accordance with a specific embodiment of the present invention, the weighted device 122 (FIG. 1) is utilized to measure the tilt angle $\theta_{ED}$ of the electronic device 200. In a specific embodiment, the weighted device 122 is a weighted wheel. Alternatively, the weighted device 122 can be a weighted lever having a weighted extension that hangs downward. One of ordinary skill in the art will readily realize that various means may be used implement a tilt sensor and still remain within the spirit and scope of the present invention.

The weight 124 is at the lowest possible position on the weighted device 122. Due to gravity, the weight 124 causes the weighted device 122 to rotate when the tilt angle $\theta_{ED}$ of the electronic device 200 changes. The rotational angle $\theta_{ED}$ of the weighted device 122 corresponds to the tilt angle $\theta_{ED}$ of the electronic device 200. As such, the rotational position of the weighted device 122 corresponds to the tilt angle $\theta$.

Since the weighted device 122 is mounted on the shaft 128 of the potentiometer 124, the shaft 128 turns as the weighted device 122 rotates. The shaft 128 adjusts a resistance in the potentiometer 124. The resistance corresponds to a voltage. Accordingly, the potentiometer 124 outputs a voltage that is based on the position of the weighted device 122, and the voltage thus corresponds to the tilt angle $\theta_{ED}$ of the electronic device 200. The ADC 112 coverts the voltage from an analog to a digital voltage.

Generally, the angle managing unit 114 uses this tilt information so that it can wake up the processor 110 when the tilt angle $\theta_{ED}$ returns to within the in-use range. When awake, the processor 110 can obtain the tilt information from the angle thresholding unit 114 for adapting the in-use range of angles for a particular user. The processor 110 also reads the voltage from the ADC 112 and determines the tilt angle $\theta_{ED}$ from the voltage. If the tilt angle $\theta_{ED}$ falls outside the in-use range, the processor 110 causes the electronic device 200 to enter the power conservation state.

More specifically, while the electronic device 200 is in the power conservation state, the tilt angle $\theta_{ED}$ is still monitored so that the electronic device quickly "wakes up" (i.e., returns to a normal power state) if the electronic device 200 is tilted back within the in-use range. Before entering the power conservation state, the processor 110 stores the in-use range by writing binary threshold values to the buffers 116: one for the largest tilt angle $\theta_{ED}$ value in the in-use range, and one for the lowest tilt angle $\theta_{ED}$ value in the in-use range. The comparators 118 compare the actual tilt angle $\theta_{ED}$ with the threshold values. If the actual tilt angle $\theta_{ED}$ is within the threshold values (i.e., within the stored in-use range), the comparators 118 wake up the processor 110 such that the electronic device 200 goes back to a normal power state. As shown in FIGS. 1A and 1B, this comparator function is be achieved using digital or analog signals.

In accordance with the present invention, once the electronic device enters the power conservation state, input devices (e.g., keyboard or the touch screen) are deactivated. This allows the user to carry the device in a variety of comfortable ways, such as the way a book is carried vertically and against the user's body (FIGS. 6 and 7).

In accordance with the present invention, if the user does not want the electronic device to enter the power conservation state, the user can override it by pressing an override or "wake-up" button. If the user overrides the power conservation state, the electronic device goes into a normal power state. The wake-up button also accommodates a user who often carries the electronic device 200 at different tilt angles when looking at the electronic device 200. For example, some users carry tablet-type hand-held devices like a book when they are looking at them. In learning mode, pressing the wake-up button can cause the current tilt angle $\theta_{ED}$ to be included in the range of tilt angles for determining the in-use range. This can, in effect, broaden the in-use range for the next use.

According to the system and method disclosed herein, the present invention provides numerous benefits. For example, it conserves more power because the electronic device 200 goes into a power conservation state immediately when the electronic device is no longer in use, such as when the electronic device 200 it is placed down on a table (i.e., tilt angle $\theta_{ED}=90°$). The system and methods of the present invention can also be used in conjunction with conventional methods of entering a sleep mode.

A system and method for conserving power in an electronic device has been disclosed. The system and method utilize a tilt sensor to determine the tilt angle of the electronic device. The tilt angle indicates whether the electronic device is in use. If the tilt angle falls outside of a predetermined range, the tilt sensor causes the electronic device to enter a power conservation state. The electronic device can adapt the predetermined range of angles to the way individual users hold the electronic device as they use it.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A system for conserving power in an electronic device, the circuit comprising:
    a processor;
    a tilt sensor operatively coupled to the processor, wherein the processor utilizes the tilt sensor to monitor a tilt angle of the electronic device and causes the electronic device to enter a power conservation state if the tilt angle falls outside of a predetermined range; and
    an angle measuring unit for storing the predetermined range and for comparing a current tilt angle to the predetermined range.

2. The system of claim 1 wherein the tilt sensor comprises a weighted device moveably coupled to the electronic device, wherein the position of the weighted device corresponds to the tilt angle.

3. The system of claim 2 wherein the tilt sensor further comprises a potentiometer operatively coupled to the weighted device, wherein the potentiometer outputs a voltage based on the position of the weighted device, and wherein the voltage corresponds to the tilt angle.

4. The system of claim 2 wherein the weighted device is a weighted wheel.

5. The system of claim 2 wherein the weighted device comprises a weight, wherein the weight causes the weighted device to rotate when the tilt angle changes.

6. The system of claim 1 further comprising an override button so that a user can override the power conservation state by pressing the override button.

7. A system for conserving power in an electronic device, the circuit comprising:
    a processor;
    a tilt sensor operatively coupled to the processor, wherein the processor utilizes the tilt sensor to monitor a tilt angle of the electronic device and causes the electronic device to enter a power conservation state if the tilt angle falls outside of a predetermined range, wherein the tilt sensor comprises:
        a weighted device moveably coupled to the electronic device, wherein the position of the weighted device corresponds to the tilt angle; and
        a potentiometer operatively coupled to the weighted device, wherein the potentiometer outputs a voltage based on the position of the weighted device, and wherein the voltage corresponds to the tilt angle; and
    an angle measuring unit for storing the predetermined range, and for comparing a current tilt angle to the predetermined range.

8. The system of claim 7 further comprising an override button so that a user can override the power conservation state by pressing the override button.

9. The system of claim 7 wherein the weighted device is a weighted wheel.

10. The system of claim 7 wherein the weighted device comprises a weight, wherein the weight causes the weighted device to rotate when the tilt angle changes.

11. A method for conserving power in an electronic device, the method comprising:
    monitoring a tilt angle of the electronic system;
    storing the predetermined range;
    comparing a current tilt angle to the predetermined range; and
    entering a power conservation state when the tilt angle falls outside of the predetermined range.

12. The method of claim 11 wherein the monitoring step comprises measuring the tilt angle when information is entered into the electronic system.

13. The method of claim 12 wherein the information comprises input information.

14. The method of claim 11 wherein the monitoring step comprises storing the tilt angles monitored during a prior usage of the electronic device, wherein the predetermined range is based on the range of stored tilt angles.

15. The method of claim 11 wherein the monitoring step comprises storing the tilt angles monitored during a prior usage of the electronic device, wherein the predetermined range is larger than the range of stored tilt angles by a predetermined number of degrees.

16. The method of claim 15 wherein the predetermined number of degrees is substantially greater than 1 degree.

17. The method of claim 11 wherein the monitoring step comprises storing the tilt angles monitored during a prior usage of the electronic device, wherein the predetermined range is larger than the range of stored tilt angles by a predetermined number of percentage points.

18. The method of claim 11 further comprising entering a normal power state if a user overrides the power conservation state.

19. The method of claim 11 wherein the entering step comprises entering a low-power sleep state.

20. The method of claim 11 wherein the entering step comprises turning off the electronic system.

21. The method of claim 11 wherein the predetermined range is manually programmed by a user.

22. The method of claim 11 wherein the predetermined range is between 0 degrees and 90 degrees.

23. A computer readable medium containing program instructions for conserving power in an electronic system, the program instructions which when executed by a computer system cause the computer system to execute a method comprising:

monitoring a tilt angle of the electronic system;
storing a predetermined range;
comparing a current tilt angle to the predetermined range; and
entering a power conservation state when the tilt angle falls outside of the predetermined range.

24. The computer readable medium of claim 23 wherein the monitoring step comprises program instructions for measuring the tilt angle when information is entered into the electronic system.

25. The computer readable medium of claim 24 wherein the information comprises input information.

26. The computer readable medium of claim 23 wherein the monitoring step comprises program instructions for storing the tilt angles monitored during a prior usage of the electronic device, wherein the predetermined range is based on the range of stored tilt angles.

27. The computer readable medium of claim 23 wherein the monitoring step comprises program instructions for storing the tilt angles monitored during a prior usage of the electronic device, wherein the predetermined range is larger than the range of stored tilt angles by a predetermined number of degrees.

28. The computer readable medium of claim 27 wherein the predetermined number of degrees is substantially greater than 1 degree.

29. The computer readable medium of claim 23 wherein the monitoring step comprises program instructions for storing the tilt angles monitored during a prior usage of the electronic device, wherein the predetermined range is larger than the range of stored tilt angles by a predetermined number of percentage points.

30. The computer readable medium of claim 23 further comprising entering a normal power state if a user overrides the power conservation state.

31. The computer readable medium of claim 23 wherein the entering step comprises program instructions for entering a low-power sleep state.

32. The computer readable medium of claim 23 wherein the entering step comprises program instructions for turning off the electronic system.

33. The computer readable medium of claim 23 wherein the predetermined range is manually programmed by a user.

34. The computer readable medium of claim 23 wherein the predetermined range is between 0 degrees and 90 degrees.

* * * * *